United States Patent [19]

Owades

[11] Patent Number: 5,064,662
[45] Date of Patent: Nov. 12, 1991

[54] METHOD OF MAKING SALT/FREE SAUERKRAUT

[76] Inventor: Joseph L. Owades, 3097 Wood Valley Rd., Sonoma, Calif. 95476

[21] Appl. No.: 612,864

[22] Filed: Nov. 13, 1990

[51] Int. Cl.$^5$ ............................................. A23B 7/10
[52] U.S. Cl. ..................................... 426/49; 426/615; 426/61
[58] Field of Search ................... 426/49, 615, 17, 626, 426/267, 61

[56] References Cited

U.S. PATENT DOCUMENTS 2,899,314  8/1959  Rohrkaste ............................ 426/48
2,960,410  11/1960 Rohrkaste ............................ 426/48
4,614,655  9/1986  Hashino et al. ...................... 426/49
4,828,848  5/1989  Owades ................................ 426/49

Primary Examiner—Marianne Cintins
Attorney, Agent, or Firm—Richard L. Neeley

[57] ABSTRACT

A method of preparing pickled cabbage by a fermentation process, typically in the absence of added salt, wherein the fermentation step of the process consists essentially of fermenting cabbage in the presence of a mixture of ethanol and an ingestible acid selected from the group consisting of acetic acid, lactic acid, malic acid, citric acid, and phosphoric acid, wherein the mixture adds between 25 and 45 osmoles to 100 pounds of cabbage. Similar processes in which part, rather than all, of the salt normally added during fermentation is replaced by the alcohol/acid mixture are also disclosed.

15 Claims, No Drawings

METHOD OF MAKING SALT/FREE SAUERKRAUT

INTRODUCTION

1. Technical Field

The present invention relates to a method of making sauerkraut (also known as kraut or pickled cabbage). More particularly, it relates to a method of preparing sauerkraut without the use of sodium chloride or other metallic salts. It also relates to a method for producing a more rapid fermentation in the production of sauerkraut.

2. Background

Cabbage has long been preserved and made more flavorful by a salt-induced fermentation which results in sauerkraut. The cabbage is shredded and mixed with solid sodium chloride, usually from 2 to 2½% by weight of the cabbage, and allowed to rest in tanks or barrels for from 4 to 6 weeks. During this time a series of lactic acid bacteria ferment the sugars which are drawn from the cabbage by the high salt concentration. *Leuconostoc mesenteroides* usually prevails at the start of the fermentation and is succeeded by a series of lactobacilli, of which *Lactobacillus cucumeris* and *L. pentoaceticus* are typical.

The sodium chloride provides a suitable environment for the lactobacilli that are required to effect the desirable changes in converting cabbage to sauerkraut. The salt exerts an osmotic pressure sufficient to draw sugars and other nutrients from the cabbage and so provide appropriate nutrition for the rather fastidious lactobacilli.

The bacteria produce acids and other products, of which lactic acid is dominant, with a minor amount of acetic acid. The acidity may reach levels of 1.5% (defined as grams of acid calculated as lactic acid per 100 ml) or higher (up to 2.5%), and the pH falls to the range of from 3.4 to 388.

The use of salt in producing sauerkraut has always been considered essential, and the U.S.D.A. grade standards for sauerkraut even provide a minimum amount (1.1%) for the kraut to be graded as grade A.

However, consumer concerns regarding sodium intake has prompted the development of low-salt products, and some no-salt products. The present inventor has received a patent on producing pickled cucumbers and other vegetables, including cabbage, without the use of salt. See U.S. Pat. No. 4,828,848, issued May 9, 1989, which is herein incorporated by reference. However, the prior process, although functional for cabbage, is unsatisfactory for producing commercially acceptable sauerkraut in an acceptable time frame.

3. Relevant Literature

The production of sauerkraut has been described by Creuss in "Commercial Fruit and Vegetable Products", McGraw-Hill Book Co., 1958, p. 722-725, and in Frazer's "Food Microbiology", McGraw-Hill Book Co., 1967, p. 199-212. The relationship between concentration of molecules dissolved in water and osmotic pressure has long been known and is described in numerous physical chemistry texts, such as Daniels and Alberty, *Physical Chemistry*, 3rd edition, John Wiley & Sons, 1967, p. 170-172.

SUMMARY OF THE INVENTION

The present invention provides a method of producing pickled cabbage (also known as sauerkraut, or just kraut) without the use of sodium chloride, or any other salts, in which the solid salt is replaced, in whole or in part, with an osmotically equivalent solution of ethanol and an edible acid (acetic, lactic, citric, phosphoric, or malic). It also provides a method for more rapidly converting cabbage to kraut.

DESCRIPTION OF SPECIFIC EMBODIMENTS

The present invention has arisen out of investigations into alternatives to the use of sodium chloride in producing sauerkraut. It has been discovered and reported in U.S. Pat. No. 4,828,848, that the brine solution normally used in pickling vegetables may be replaced with an osmotically equivalent solution of ethyl alcohol and an organic acid (acetic or lactic acids).

This process is functional for many vegetables, including cabbage. However with cabbage, the solutions described in the patent cited require 2-4 months to cure, and the cabbage rarely attains the optimum level of acidity of commercial kraut.

It has now been found that the addition of higher concentrations of alcohol and acid to provide higher osmotic pressure allows replacement of the solid sodium chloride previously used and also allows the cabbage to adequately cure in less time than is required with salt. This last effect is surprising, since no decrease in fermentation time was seen in the patented process. The reason for the reduction in time is not known, but it may he caused by the availability of the alcohol as a substrate for the microbes, so that their metabolism is enhanced by the dual source of carbon—the sugars in the cabbage osmotically released by the ethanol and acid and the ethanol itself. This invention also gives a very firm, crisp kraut, without the use of any metallic salts.

Since osmotic pressure depends on the number of dissolved particles in a given volume of solution, the necessary amounts of an edible acid and ethanol can readily be calculated from the molecular weights of these materials. Concentration of solutes in such solutions is often expressed in osmolarity, which expresses the total number of moles of particles per liter of solution rather than the number of formula weights or molecular weights per liter. Accordingly, a 1 molar solution of sodium chloride is 2 osmolar and a 1 molar solution of a non-ionizing substance, such as ethanol, is 1 osmolar.

The 2-2½ lbs. of sodium chloride to 100 lbs. of cabbage that is customarily used in sauerkraut production provides from 31 osmoles sodium chloride to 39 osmoles sodium chloride.

It has been found that replacing this number of osmoles of salt with a mixture of ethanol and an edible acid, such as acetic acid, of approximately the same number of osmoles gives a cured kraut in less time than with salt, and further gives a firm texture and the characteristic flavor of kraut.

The invention can be practiced by utilizing any mixture of ethanol and an edible acid as long as the number of osmoles added is approximately within the limits above, and the flavor is acceptable. Preferably, the number of osmoles of edible acid and ethanol together is from about 25 to about 45, more preferably about 28 to 42, and most preferably from 31 to 39, per 100 pounds of cabbage. The cabbage is typically chopped or shredded prior to addition of the acid/alcohol mixture and fermentation of the resulting mixture. No water per se is required, since water will be drawn from the cabbage. The initial osmolarity of the alcohol/acid mixture is therefore quite high (e.g., 10 to 20 osmolar or higher, depending on the ratio of alcohol to dissolved acid). Some water, however, generally up to 10% by weight of the total composition (including the cabbage), more preferably 6% water or less, can be included if desired. Water is generally included for convenience in handling because of the commercial forms in which ethanol and various acids are available. For example, acetic acid is generally used as vinegar, which is a solution of acetic acid in water. Ethanol is generally added as an aqueous mixture containing some percentage of water.

Practically, the molar amount of ethanol is added about 12 times or more that of the acid, since the fermentation produces lactic acid, and the acidity would then be too high if appreciably lower molar ratios of ethanol to acid were to be used.

Any edible acid can be used, including acetic, lactic, malic, citric, and phosphoric acid.

If desired, either the ethanol or the acid used in the process of the invention can be provided in the form of a derivative that releases the active component slowly over time. Ethyl esters are a preferred derivative, since they are derivatives of both acids and ethanol and therefore provide both active components upon hydrolysis (which occurs both chemically and biochemically in solution). One useful material for the practice of the invention is ethanol denatured with ethyl acetate (a commercially available form of ethanol that is not subject to beverage taxes). Ethyl esters of other edible (ingestible) acids can also be used. Addition of an ethyl ester is equivalent to addition of corresponding amounts of the acid and ethanol, so that reference herein to addition of a mixture of acid and ethanol encompasses addition of an ethyl ester of the acid (plus whatever extra amount of free acid or alcohol necessary to give the indicated molar ratios).

In addition to carrying out the invention by replacing all of the sodium chloride that is normally added during the fermentation process, the present invention can also be carried out by replacing a substantial fraction of the added salt to reduce the salt content, thereby producing "low-salt" sauerkraut rather than "no-salt" sauerkraut. Typically, at least half of the salt is replaced by the mixture of acid and alcohol, preferably at least 75%.

As indicated previously, the length of the fermentation step of preparing sauerkraut is reduced by replacing the normal salt solution with the alcohol/acid mixture of the present invention. Normally, the fermentation process using salt takes at least 30 days at 50–70° F. When all of the salt is replaced by the alcohol/acid mixture of the invention, the time required for fermentation is reduced by at least 30%, usually at least 50%. Typical fermentation times are from 10 to 20 days, preferably from 12 to 15 days at 50–70° F. Fermentations at other temperatures also occur more rapidly. Partial replacement of salt results in proportional savings in fermentation time. The short fermentation times of the invention cannot be obtained by the salt process at the same temperature and represent a significant improvement over both the salt process of preparing sauerkraut and the prior patented procedure which uses a solution having an osmolarity of from about 0.6 to about 3.5.

In addition to the fermentation step, improvement of which is an object of the present invention, additional steps can also occur in the overall sauerkraut preparation process, as is know in the art. For example, flavorings can be added or canning or heat pasteurization steps can occur.

The invention now being generally described, the same will be better understood by reference to the following detailed examples, which are provided for purposes of illustration only and are not to be considered limiting of the invention unless so specified.

EXAMPLE 1

The following quantaties were used to produce a pickled cabbage:
  100 g shredded cabbage
  5 ml 190 proof ethanol
  5 ml 90 grain vinegar (9% acetic acid)

The shredded cabbage was placed in a glass container, and the alcohol and vinegar were added. The filled container was closed and stored at 65°–70° F. for 7–10 days in most cases. In some cases, longer fermentation periods were allowed. No difference in the acceptability of the sauerkraut was noted depending on length of fermentation. The pickled cabbage was then stored while refrigerated, or it was heated to 175° F. for stabilization and stored at room temperature.

EXAMPLE 2

The following amounts of materials were used for preparing additional pickled cabbage using a different mixture of pickling components:
  100 g shredded cabbage
  7.5 ml of 125 proof alcohol
  2 g citric acid The acid was dissolved in the alcohol and added to the cabbage in a filled container. The mixture was kept at 60°–72° F. for 7–10 days, or for longer times in some cases. No difference in the kraut was seen with different lengths of fermentation. The container was then refrigerated, or the kraut was heated to 175° F. and repacked hot for storage.

All publications mentioned in this specification are herein incorporated by reference to the same extent as if each individual publication was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of preparing pickled cabbage by a fermentation process, wherein the fermentation step of said process consists essentially of:
   fermenting cabbage in the presence of a mixture of ethanol and an ingestible acid selected from the group consisting of acetic acid, lactic acid, malic acid, citric acid, phosphoric acid, and mixtures thereof, wherein said mixture adds between 25 and 45 osmoles to 100 pounds of cabbage.

2. The method of claim 1, wherein said mixture adds between 31 and 39 osmoles to 100 pounds of cabbage.

3. The method of claim 1, wherein no more than 10% water by weight relative to said cabbage is added to said cabbage prior to said fermenting.

4. The method of claim 1, wherein no sodium salts other than those present in said cabbage are present during said fermenting.

5. The method of claim 1, wherein ethanol and acid are present in a molar ratio of at least 12:1.

6. The method of claim 1, wherein said fermentation takes place in a range of temperatures from 50° to 70° F. for 20 days or fewer.

7. The method of claim 1, wherein said fermentation takes place for a length of time at least 30% less than that required to reach an equivalent stage of fermentation using an equivalent number of osmoles of sodium chloride.

8. Pickled cabbage prepared by the method of claim 1.

9. A method of preparing pickled cabbage by a fermentation process, wherein the fermentation step of said process consists essentially of:

fermenting cabbage in the presence of (1) sodium chloride and (2) a mixture of ethanol and an ingestible acid selected from the group consisting of acetic acid, lactic acid, malic acid, citric acid, and phosphoric acid, wherein said salt and said mixture together add between 25 and 45 osmoles to 100 pounds of cabbage, wherein said mixtures account for at least 50% of said osmoles.

10. The method of claim 9, wherein said mixture accounts for at least 75% of said osmoles.

11. The method of claim 9, wherein said salt and said mixture add between 31 and 39 osmoles to 100 pounds of cabbage.

12. The method of claim 9, wherein no more than 10% water by weight relative to said cabbage is added to said cabbage prior to said fermenting.

13. The method of claim 9, wherein said fermentation takes place in a range of temperatures from 50° to 70° F. for 20 days or fewer.

14. The method of claim 9, wherein said fermentation takes place for a length of time at least 30% less than that required to reach an equivalent stage of fermentation using an equivalent number of osmoles of sodium chloride.

15. Pickled cabbage prepared by the method of claim 9.

* * * * *